INVENTOR.
JACK E. MARTENS
BY
ATTORNEY

United States Patent Office 3,288,527
Patented Nov. 29, 1966

3,288,527
MOVABLE SEAT BACK
Jack E. Martens, Bloomfield Hills, Mich., assignor to The Anderson Company, a corporation of Indiana
Original application May 9, 1963, Ser. No. 279,288. Divided and this application July 7, 1965, Ser. No. 470,027
1 Claim. (Cl. 297—355)

This application is a division of my copending application Serial No. 279,288 filed May 9, 1963 which is a continuation-in-part of application Serial No. 168,785 filed January 25, 1962 and now issued as U.S. Patent No. 3,104,130.

This invention relates to a positionable back rest of a chair and is more particularly directed to structure for supporting the positionable back rest.

Attention is being given by the automotive industry to positionable backs for front seats of automobiles. The back as shown herein is carried on the seat and adapted to be fixedly retained in an upright position or in infinite positions rearwardly of the upright position. Additionally, the back is adapted to be pivoted forwardly of the upright position for admitting passengers to a rear seat. The pivotal movement rearwardly and the pivotal movement forwardly from the upright position is about different axes.

Therefore, an object of this invention is to provide improved structure for positioning the back of an automobile seat or other type seat.

Other objects and advantages of the invention will become apparent after the description hereinafter set forth is considered in conjunction with the drawings annexed hereto.

Figure 1:
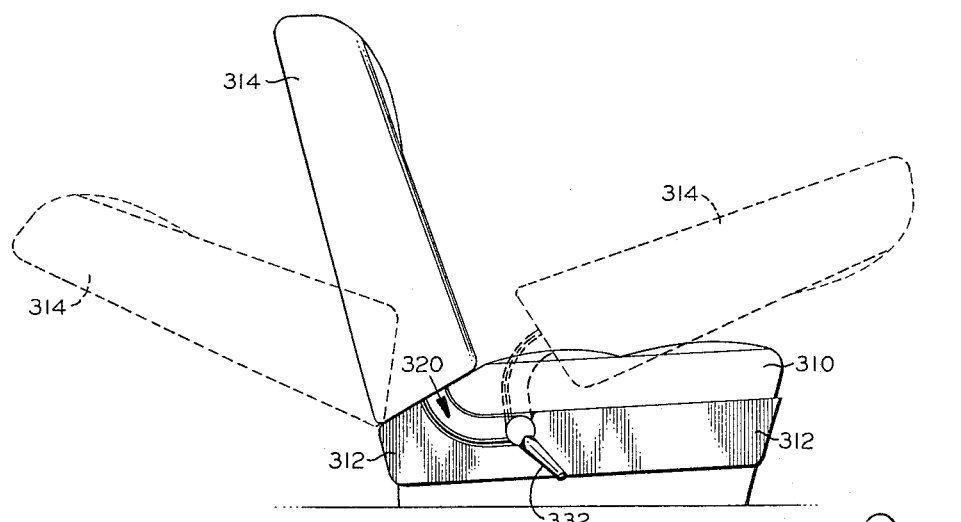
FIGURE 1 is a side view of an automobile seat employing the invention and showing the back rest in plural positions.
Figure 2:
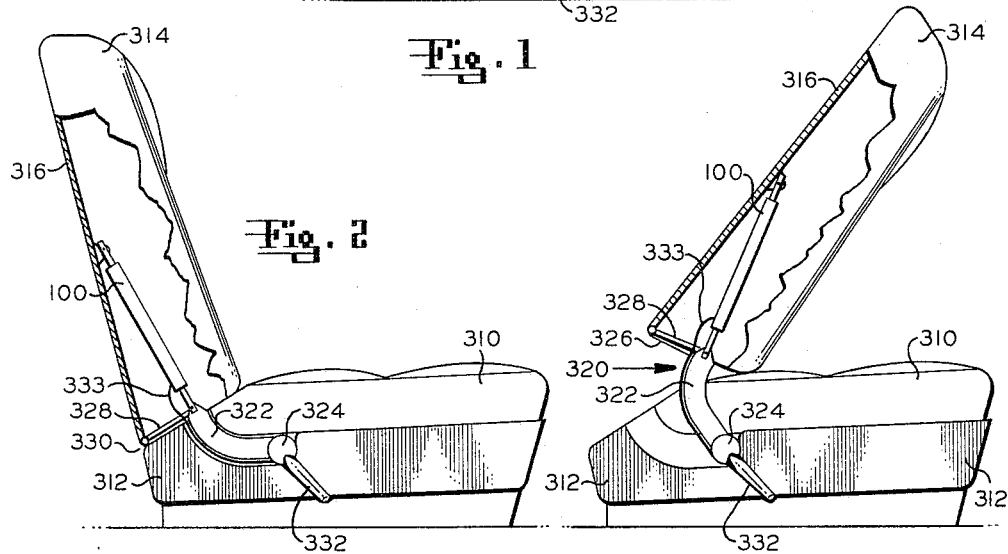
FIGURE 2 is a partially cutaway view of the structure of FIGURE 1 in vertical or upright position.
Figure 3:
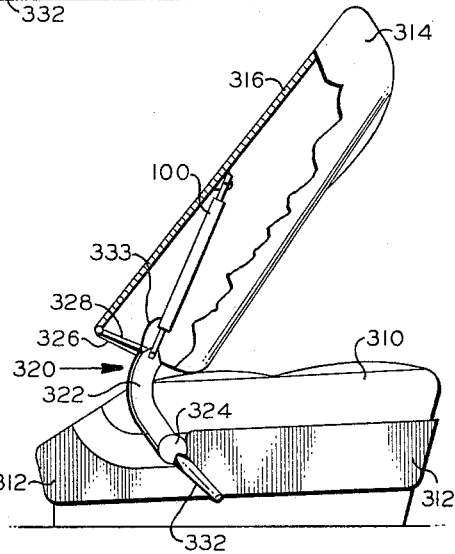
FIGURE 3 is a partially cutaway view of the structure of FIGURE 1 in a position forward of the upright position.
Figure 4:
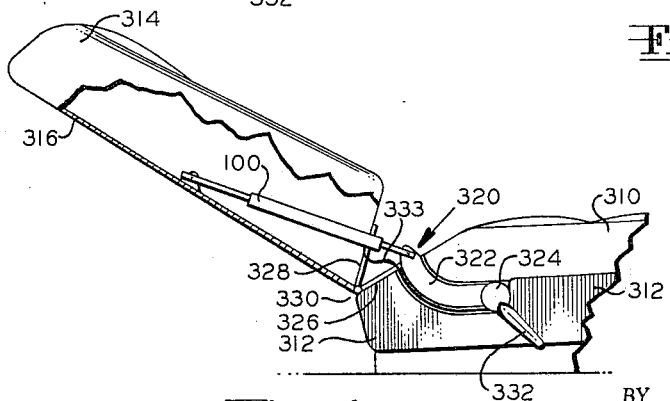
FIGURE 4 is a partially cutaway view of the structure of FIGURE 1 in a reclining position rearwardly of the upright position.

My invention for supporting a back rest relative to a seat is illustrated in FIGURES 1 through 4 of the drawings. FIGURE 1 is a side view showing the back rest in a solid line upright position and in phantom lines rearwardly and forwardly of the upright position. FIGURES 2 through 4 show the back rest in various positions. A cushion 310 is carried on a rigid seat frame 312 which is adapted to be supported on the floor of an automobile. Back rest frame 316 carries back cushion 314 and is adapted to be pivoted relative to the seat by structure 320. This structure connects frame 316 to frame 312 for supporting the back rest in an upright position as shown in FIGURE 2, in a forward tilted position as shown in FIGURE 3, and in a rearward position as shown in FIGURE 4, or any intermediate positions.

Structure 320 comprises a lateral plate 326 and a pair of side members 322 disposed on opposite sides of the frame 312. One end of each side member 322 is pivotally mounted at 324 to frame 312 a distance forward of the rear portion of the seat. Plate 326 bears against frame 312 when the back rest is in the positions shown in FIGURES 2 and 4. When the back rest is titlted forwardly as shown in FIGURE 3, plate 326 is lifted from frame 312 and the side members 322 pivot about joints 324 on opposite sides of frame 312. The pivots at 324 may be any type known in the art such as bolts or pins.

As can be seen in FIGURES 3 and 4, frame 316 of the back rest carries a plate 328 along its lower extremity for seating adjacent lateral plate 326 when the back rest is upright or forward thereof. Resilient stops may be placed between plates 326 and 328 to lessen shock. Plates 326 and 328 are pivotally connected at their rear edges by a hinge 330, thereby establishing a pivotal connection between back rest 316 and structure 320.

A seat adjustor or position-holding device 100 of the type disclosed in my U.S. Patent 3,104,130 is connected between structure 320 and back rest frame 316. The adjustor 100 holds in tension and is manually retractable under light compression. By holding in tension, the adjustor is adapted to retain the back rest in upright position (FIGURE 2) against a rearwardly directed force thereby supporting a human body. As shown in FIGURE 4, the adjustor is adapted to retain the back rest in a reclining position against rearward forces of a reclining human body. The same holding action is true for any position of the back rest rearwardly of the upright position.

Tilting of the back rest on hinge 330 from the position of FIGURE 4 to that of FIGURE 2 is attained by only a slight manual tug in a forward direction just sufficient to overcome internal friction in adjustor 100. Continued forward movement of the back rest beyond its upright position is permitted by pivotal movement about pivots 324 (see FIGURE 3).

The upright position may be further defined as the position when structure 320 is pivoted counterclockwise as far as possible relative to seat 312 and when back rest frame 316 is pivoted clockwise as far as possible relative to structure 320.

Adjustor 100, as disclosed in U.S. Patent 3,104,130, is provided with an manual release mechanism which, when activated, permits relatively free axial extension or contraction of movable parts. In the present arrangements, manual manipulation of handle 332 is transmitted through a Bowden wire 333 or the like to actuate the adjustor so that there is no braking or holding action in either longitudinal direction. This permits the back rest to be moved rearwardly to a desired position, whereupon release of handle 332 permits normal holding action of the adjustor to prevent further rearward movement of the back rest.

As can be seen in FIGURE 3, no active cooperation of adjustor 100 is required when the back rest is pivoted forwardly from the upright position. Movement of the back rest is normally about one of two separate pivots— about pivot 330 to the rear and about 324 to the front.

FIGURE 3 clearly shows that by reason of the forward position of pivot 324 more room is available for entry of a passanger to the rear seat of a two-door automobile.

Having thus described my invention, it is obvious that various modifications may be made in the same without departing from the spirit of the invention; and, therefore, I do not wish to be understood as limiting myself to the exact forms, constructions, arrangements and combinations of parts herein shown and described.

I claim:

In a seat and positionable back rest, structure for positioning said positionable back forwardly and rearwardly of an upright position comprising:
 a first plate having depending side members positioned astride and pivotally connected to said seat to permit forward and rearward tilting of said structure about said connection,
 said plate adapted to abut against said seat to arrest further pivotal movement in a rearward direction,
 a second plate fixedly supporting said back rest and being hingedly connected to said first plate along adjacent rearward edges for permitting pivotal movement of said second plate relative to said first plate from an upright position to a position rearwardly of said upright position, and a position-holding device operatively connected at one end to said back rest at a position above said hinged connection and at its other end to said structure so as to selectively hold said back rest in selected position relative to said structure.

References Cited by the Examiner

UNITED STATES PATENTS

| | | | |
|---|---|---|---|
| 2,685,913 | 8/1954 | Schlueter | 248—377 |
| 2,955,644 | 11/1960 | Kramer | 297—378 |
| 3,007,737 | 11/1961 | Lichter | 297—378 |
| 3,062,584 | 11/1962 | Galla | 297—374 |

FRANK B. SHERRY, *Primary Examiner.*

R. B. FARLEY, G. O. FINCH, *Assistant Examiners.*